United States Patent
Baker

(10) Patent No.: US 10,949,177 B2
(45) Date of Patent: *Mar. 16, 2021

(54) METHOD AND SYSTEM OF A COMMAND BUFFER BETWEEN A CPU AND GPU

(71) Applicant: Oxide Interactive, LLC, Towson, MD (US)

(72) Inventor: Daniel K. Baker, Towson, MD (US)

(73) Assignee: Oxide Interactive, LLC, Towson, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,140

(22) Filed: Sep. 20, 2018

(65) Prior Publication Data

US 2020/0057613 A1    Feb. 20, 2020

Related U.S. Application Data

(63) Continuation of application No. 14/988,940, filed on Jan. 6, 2016, now Pat. No. 10,101,977, which is a
(Continued)

(51) Int. Cl.
| | |
|---|---|
| *G06T 1/20* | (2006.01) |
| *G06T 1/00* | (2006.01) |
| *G06T 1/60* | (2006.01) |
| *G06F 8/41* | (2018.01) |
| *G06F 9/50* | (2006.01) |
| *G06T 15/00* | (2011.01) |

(Continued)

(52) U.S. Cl.
CPC ............ *G06F 8/41* (2013.01); *G06F 8/443* (2013.01); *G06F 8/447* (2013.01); *G06F 8/51* (2013.01); *G06F 9/45516* (2013.01); *G06F 9/5016* (2013.01); *G06F 9/5044* (2013.01); *G06F 9/5083* (2013.01); *G06T 1/00* (2013.01); *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | |
|---|---|---|
| 6,115,757 A | 9/2000 | Honda |
| 6,139,199 A | 10/2000 | Rodriguez |

(Continued)

*Primary Examiner* — Joni Hsu
(74) *Attorney, Agent, or Firm* — Nixon Peabody LLP

(57) ABSTRACT

A method and system for a command processor for efficient processing of a program multi-processor core system with a CPU and GPU. The multi-core system includes a general purpose CPU executing commands in a CPU programming language and a graphic processing unit (GPU) executing commands in a GPU programming language. A command processor is coupled to the CPU and CPU. The command processor sequences jobs from a program for processing by the CPU or the GPU. The command processor creates commands from the jobs in a state free command format. The command processor generates a sequence of commands for execution by either the CPU or the GPU in the command format. A compiler running a meta language converts program data for the commands into a first format readable by the CPU programming language and a second format readable by the GPU programming language.

20 Claims, 3 Drawing Sheets

Related U.S. Application Data continuation of application No. 14/174,091, filed on Feb. 6, 2014, now Pat. No. 9,235,871.

(51) Int. Cl.
  *G06F 9/455* (2018.01)
  *G06F 8/51* (2018.01)

(56) References Cited

U.S. PATENT DOCUMENTS

| | | |
|---|---|---|
| 6,769,115 B1 | 7/2004 | Oldman |
| 7,196,710 B1 | 3/2007 | Fouladi |
| 8,711,159 B2 | 4/2014 | Li |
| 2008/0235713 A1 | 9/2008 | Beverly |
| 2009/0027403 A1* | 1/2009 | Jung .................. G06T 1/20 345/505 |
| 2010/0156888 A1 | 6/2010 | Luk |
| 2011/0242118 A1 | 10/2011 | Bolz |
| 2011/0242119 A1 | 10/2011 | Bolz |
| 2012/0293519 A1 | 11/2012 | Ribble |
| 2013/0297919 A1 | 11/2013 | Kang |
| 2014/0184606 A1 | 7/2014 | de Richebourg |

* cited by examiner

METHOD AND SYSTEM OF A COMMAND BUFFER BETWEEN A CPU AND GPU

CROSS-REFERENCE TO RELATED APPLICATIONS

This application is a continuation of U.S. patent application Ser. No. 14/988,940, filed Jan. 6, 2016, now issued as U.S. Pat. No. 10,101,977, which is a continuation of U.S. patent application Ser. No. 14/174,091, filed Feb. 6, 2014, now issued as U.S. Pat. No. 9,235,871, each of which is hereby incorporated by reference herein in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to a command buffer between a CPU and a GPU and more specifically a command buffer operated by a command processor to coordinate instructions to efficiently execute on a system including a CPU and GPU.

BACKGROUND

Current processing systems have multiple processing cores to provide parallel processing of computational tasks, which increase the speed of completing such tasks. For example specialized processing chips such as graphic processing units (GPU) have been employed to perform complex operations such as rendering graphics. A GPU is understood as a specialized processing circuit designed to rapidly manipulate and alter memory to accelerate the creation of images in a frame buffer intended for output to a display. GPUs may include hundreds if not thousands of processing cores since graphic processing may be massively parallelized to speed rendering of graphics in real-time. GPUs perform various graphic processing functions by performing calculations related to 3D graphics. These include accelerating memory-intensive work such as texture mapping and rendering polygons, performing geometric calculations such as the rotation and translation of vertices into different coordinate systems. GPUs may also support programmable shader programs, which can manipulate vertices and textures, oversampling and interpolation techniques to reduce aliasing, and very high-precision color spaces.

Most graphics systems are built on top of an application program interface (API), which provides an abstracted way of running GPU programs independent of a particular hardware and operating system. APIs do not provide, however, an efficient method for binding data between the CPU and GPU, or a management system for managing GPU programs. There is also variance to the degree of which an API might handle hazards and state information, that is, situations where one operation must wait until the completion of another operation.

GPUs typically operate by performing computational tasks on a series of commands placed in a command queue. An API provides a method of indirect access to filling the command queue. A command thus might consist of binding a particular resource (an image or a memory buffer) to specific internal bind point, binding a shader program for execution, or submitting a set of triangles for rasterization.

A GPU processes a command queue serially, meaning that the commands are issued in the order they are placed in the command queue. A GPU processes these commands asynchronously from the CPU, and all synchronization must be handled by the API or the application itself. Because the GPU often accepts data from CPU, the CPU must avoid touching the memory which is in use by the GPU. This condition may be referred to as a CPU to GPU hazard. Additionally, the GPU itself is intrinsically parallel, and may execute certain commands in parallel without waiting for one operation to be complete before issuing the next one. For example, a GPU may write into an image in a command, then the next command may attempt to use this image to render an object into the screen. If not properly fenced, the second command may begin executing before the image has completed writing, thereby causing incorrect results. This situation is referenced as a GPU hazard.

The GPU is a complex device which has a significant amount of state related to executed commands. GPUs maintain an internal state which may or may not be visible to a CPU. For example, if a CPU program issues a command to bind a resource in one command, then all other commands in the queue which were placed after that command expect that this resource is bound until such a point that a new command either unbinds it or binds a different resource. Usually, the concept that each GPU command will inherit state from the previous command is directly exposed in the API.

A command buffer with a command queue is typically generated by a program operating on one or more CPUs. The state-aware nature of the API and asynchronous nature of the command queue provide difficulties in allowing multiple CPUs to add commands to the GPU. This is because state aware APIs and command queues require at least some knowledge or previous commands, which is intrinsically serial. Thus, it is difficult for two commands to process simultaneously since a preceding command must process before following commands can specify the required state changes.

Additionally, due to different architectural origins, there is often a mismatch between CPU data types and GPU data types which can introduce a significant overhead during the generation of commands.

Thus, there is a need for a command system that allows CPU and GPUs to efficiently execute program instructions. There is a further need for a meta language that allows data types to be shared efficiently between a CPU and a GPU. There is also a need for a command format that may be used independent of the processor hardware type.

SUMMARY

According to one example, a system to interface between a CPU and GPU to execute a program is disclosed. The system includes a general purpose central processing unit (CPU) executing commands in a CPU programming language. A graphic processing unit (GPU) executes commands in a GPU programming language. A command processor is accessible to the CPU and CPU. The command processor manages jobs from the program for processing by the CPU or the GPU. The command processor creates commands from the jobs in a state free command format. The command processor generates a sequence of commands for execution by either the CPU or the GPU in the command format. A compiler runs a meta language to convert program data for the commands into a first format readable by the CPU programming language and a second format readable by the GPU programming language.

Another example is a method for scheduling jobs for a CPU and a GPU in a multi-core system. A job is obtained from a program. A command related to the job is generated in a command format including all necessary states for the command via a command processor. The command is translated into a format executable by either the CPU or the GPU. Data necessary for the command is compiled into a first format associated with a CPU programming language and a second format associated with a GPU programming language. The command is stored in a command buffer. The command is assigned to the CPU or the GPU.

Another example is a non-transitory, machine readable medium having stored thereon instructions for scheduling commands for execution by a plurality of processor cores including a CPU and a GPU. The stored instructions comprise machine executable code, which when executed by at least one machine processor, causes the machine processor to obtain a job from a program. The instructions cause the processor to generate a command related to the job in a command format including all necessary states for the command via a command processor. The instructions cause the processor to translate the command into a format executable by either a CPU or a GPU. The instructions cause the processor to compile data necessary for the command into a first format readable by a CPU programming language and a second format readable by a GPU programming language. The instructions cause the processor to store the command in a command buffer and assign the command to the CPU or the GPU.

Additional aspects of the invention will be apparent to those of ordinary skill in the art in view of the detailed description of various embodiments, which is made with reference to the drawings, a brief description of which is provided below.

Figure 1:
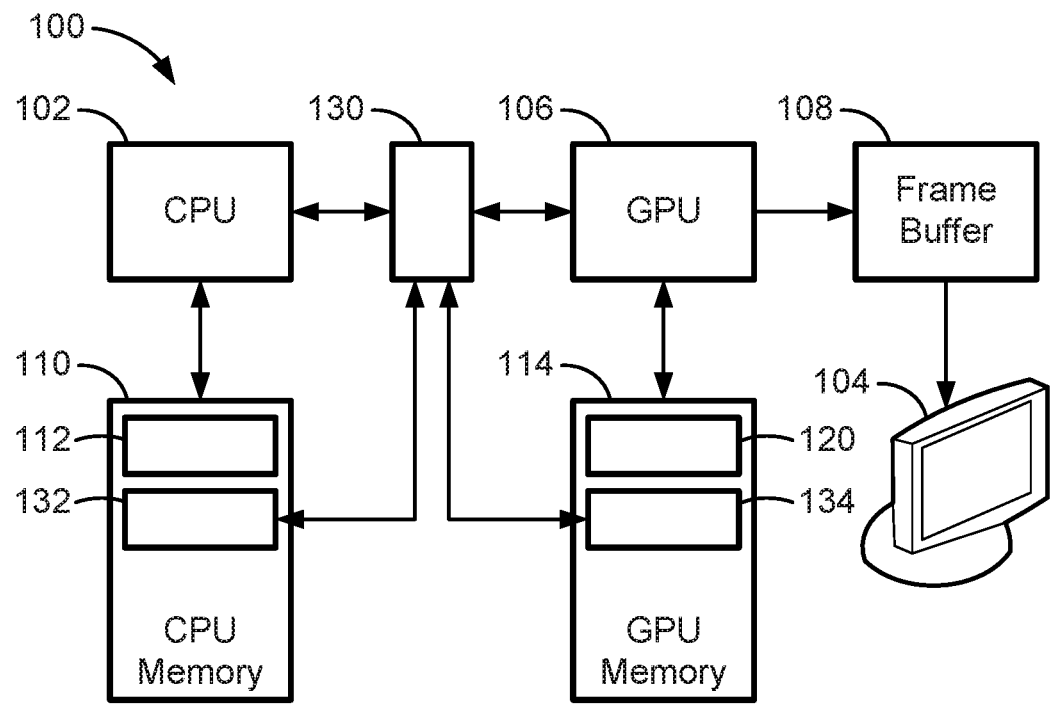
FIG. 1 is a block diagram of a multi-core system that includes a series of CPU and GPU processing units and a command processor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows an example graphic based processing system 100 that includes a game engine executing on a central processing unit (CPU) 102. As is generally understood, the game engine calls graphics that are displayed on a display 104. The graphics of the game engine are processed by a graphic processing unit (GPU) 106 and rendered in scenes stored on a frame buffer 108 that is coupled to the display 104. Although, the example in FIG. 1 is directed toward video gaming systems, it is to be understood that the principles explained herein are applicable to any application requiring real-time or high-speed graphics processing. The CPU 102 has an associated CPU memory 110 and the GPU 106 has an associated video or GPU memory 114. Although shown as a separate element in FIG. 1, the frame buffer 108 may be an allocated area of the video memory 114. It is to be understood that the CPU 102 may have multiple cores or may itself be one of multiple processing cores in the system 100. The CPU 102 executes commands in a CPU programming language such as C++. The GPU 106 executes commands in a GPU programming language such as HLSL. The GPU 106 may also include multiple cores that are specialized for graphic processing tasks.

As will be explained below, the GPU 106 executes programs to render graphic objects on the display 104 in response to requests by the central processing unit 102, which executes an example game engine program 112 stored on the CPU memory 110. The graphic processing unit (GPU) 106 is coupled to the GPU or video memory 114. The GPU 106 executes graphics processing routines such as shader programs 120 stored on the GPU memory 114.

The system 100 includes a command processor 130 which in this example runs on the CPU 102 and uses a command transfer memory 132 which is a special area of the CPU memory 110. The system 100 allows interfacing between multiple cores such as the CPU 102 and the GPU 106 to execute programs such as the game engine 112. The command processor 130 may alternatively run on the GPU 106 or on a specialized integrated circuit separate from the CPU 102 or the GPU 106. The video memory 114 includes a graphics transfer memory 134 which is a special area of memory used by the command processor 130 to exchange graphic data between the CPU 102 and the GPU 106.

Application programs such as the game engine 112 may run on the system 100 and efficiently use both the CPU 102 and the GPU 106 to execute the programming jobs of the application in parallel. The system 100 has three key components in order to coordinate the CPU 102 and the GPU 106 for processing program jobs such as graphics processing. The three key components that enable efficient operation are a virtualized, state-free, command format, the command processor 130, and an abstracted GPU specific meta language to facilitate communication and interaction between the CPU 102 and the GPU 106. First, the system 100 uses a virtualized, state-free, command format for programs running on both the CPU 102 and the GPU 106. The virtualized command format is a format that is not specific to any particular hardware or API, yet can map efficiently to commands generated by different hardware platforms such as the CPU 102 or the GPU 106. The command format allows a virtualized machine similar to that of Java where serial commands are executed independent of the specific hardware platform. The command format is state-free, in contrast to state-aware APIs, and therefore every command issued contains a reference to all states needed for that command. The command format is a command language designed to contain all required states per command. Thus, there is no inheritance of previous states and therefore may be executed independently of other commands. This allows the individual commands to be generated in parallel easily, since one command does not need to know any known previous state. Thereby, this format is used in a program [e.g., Job System] to generate and create commands across many CPU cores simultaneously. The system may generate many separate virtualized command streams, and then these command streams are serialized at some point so that operations such as rendering have a specific order (which is often required for correctness).

Second, the command processor 130 interprets the command format to any number of operating systems and APIs in an efficient manner. The command processor 130 uses the command format to access different processing cores such as the CPU 102 and the GPU 106. Since the necessary state information is referenced in each command, information from the previous commands is not needed thereby allowing parallel processing of commands in the command format. In addition, as will be explained below, the commands use a specialized transfer memory. Any particular command is abstracted such that any application built with the command format does not need specific knowledge on what hardware platform it is running on.

Third, a GPU specific meta language, referenced as an abstracted shading system in this example, is run by the GPU 106. The GPU specific meta language allows program data structures to be read both in programming language such as C++ employed by the CPU 102 and language such as high level shading language (HLSL) employed by the GPU 106. Thus, parallel data structures readable by each specific programming language are created in the CPU 102 and the GPU 106 allowing sharing of data types by the GPU specific meta language. The GPU specific meta language includes a data compiler which converts the parallel data structures authored in the meta-language into both CPU and GPU programming formats simultaneously, aligning data structures such that the CPU 102 can directly access and write data types which are read by the GPU 106. In this example, the input data for the commands is defined in the GPU specific meta language which then cross compiles (converts) the data inputs into a format readable by C++ programming language and a format readable by HLSL programming language.

In this example, the GPU specific meta language manages the shader programs 120 in collective bundles which contain all elements of a shading program to the GPU 106 (but not the inputs, which are provided by the virtualized command format). The GPU specific meta language works in conjunction with the command format, to create an easy to use, but very efficient method of programming the GPU 106 with commands and data necessary for the commands.

A shortcoming of most APIs is the inability to process commands which are not specific to operations such as rendering. Such APIs utilize the GPU 106 as a generalized processor resulting in commands being synchronized to events which they need not be. For example, the commands submitted may be implicitly synchronized to the refresh of the display. These commands have minimal requirements to occur in any particular order. Thus, an asynchronous command buffer is created in the command transfer memory 132 whereby generalized GPU work may be submitted independent of graphics rendering performed by the GPU 106.

Figure 2:
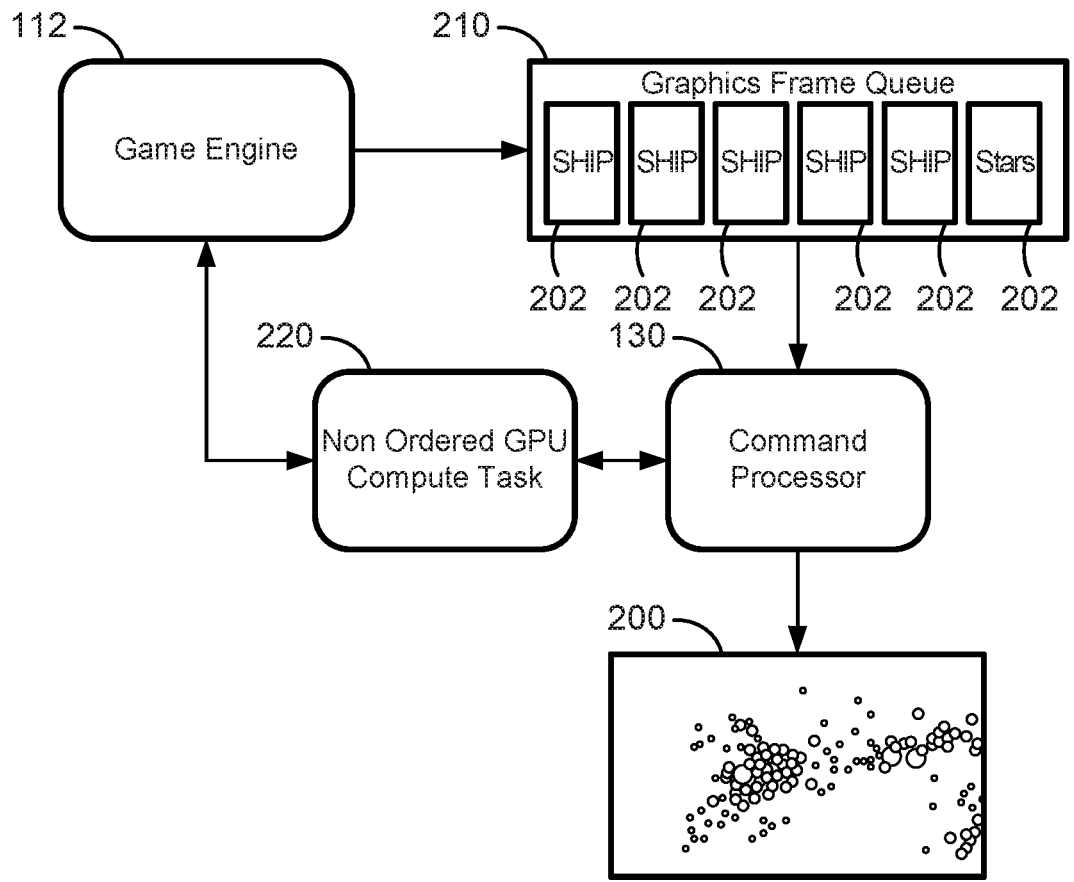
FIG. 2 is a high level flow diagram of an example of the command processor in FIG. 1 generating commands for a GPU to create a graphics frame.

FIG. 2 is a high level flow diagram of the operation of the processing system 100 in relation to a program such as the game engine 112 which may require frames of graphics to be rendered for the display 104 in FIG. 1. The game engine 112 calls for graphics for display on a frame 200 which is rendered on the display 104 in FIG. 1. The frame 200 is assembled by assembling graphic objects 202 in a graphics frame queue 210. In this example, the game engine 112 generates jobs (work) for the purpose of creating the desired frame 200. The jobs require commands which are placed in the command buffer 132 in the form of a CPU compute task 220. The command processor 130 takes the commands and translates them into the command format for the GPU 106 in order to render the graphics 202 in the frame queue 210. The work is therefore performed by the GPU 106.

In order to handle asynchronous communication between the CPU 102 and the GPU 104, the graphics transfer memory 134 in FIG. 1 is used. The graphics transfer memory 134 is accessible to programs such as the shader programs 120 stored in video memory 114. There are four types of transfer memory stored in the graphics transfer memory 134. The first type is frame graphics transfer memory. During a command executed by the CPU 102 that requires GPU execution such as rendering of a particular frame such as the frame 200 in FIG. 2, a function running on the CPU 102 may request a piece of (potentially) GPU visible memory from the GPU memory 114 for data. This memory will be automatically recycled once CPU to GPU hazards are known to be cleared. Because this memory is directly accessible by the GPU 106, this creates a low overhead method for transferring data between the GPU 102 and CPU 106. This is because the data marshaling steps that are used by most languages for data transfer are unnecessary with the direct accessibility of the graphics transfer memory 134.

The second type of transfer memory is frame command transfer memory. This memory is visible by the CPU 102 and is used for the translation of commands by the virtualized command processor 130.

A third type of transfer memory is owner graphics transfer memory. The owner graphics transfer memory is used by asynchronous commands so that the CPU 102 can write data which is accessible by the GPU 106. This transfer memory is visible to the GPU 106 and the memory is not freed automatically, but must be freed by the submitter of the command. The command processor 130 will notify the caller when it is safe to free the memory.

The fourth type of transfer memory is the owner command memory. The owner command memory is for use by asynchronous commands by the GPU 106 and stores the actual instructions of the commands themselves. The owner command memory is command processor visible memory which is not freed automatically, but must be freed by the submitter of the command. The command processor 130 will notify the caller when it is safe to free the memory.

Commands generated for the command processor 130 must be created with either frame command transfer memory or owner command transfer memory. Dynamic data for use by the GPU 106 must be created from frame graphics transfer memory or owner graphics transfer memory.

While the transfer memory types in the graphic transfer memory 134 facilitate the communication between the CPU 102 and the GPU 106, the programs running on the GPU 106 also operate on memory or images which often reside on GPU local memory 114 but may not be visible to the CPU 102. This command format operates on the GPU memory 114 which is created by the graphics systems, and referred to as resources.

The command format is designed such that commands may be generated independently from one another on any thread, and then submitted in a specific order once they are completed as shown in the task 220 in FIG. 2. Typically, a large number of CPU jobs will operate in parallel, each one creating a set of commands independently from one another, and then all of these commands are submitted serially to the command processor 130.

Figure 3:
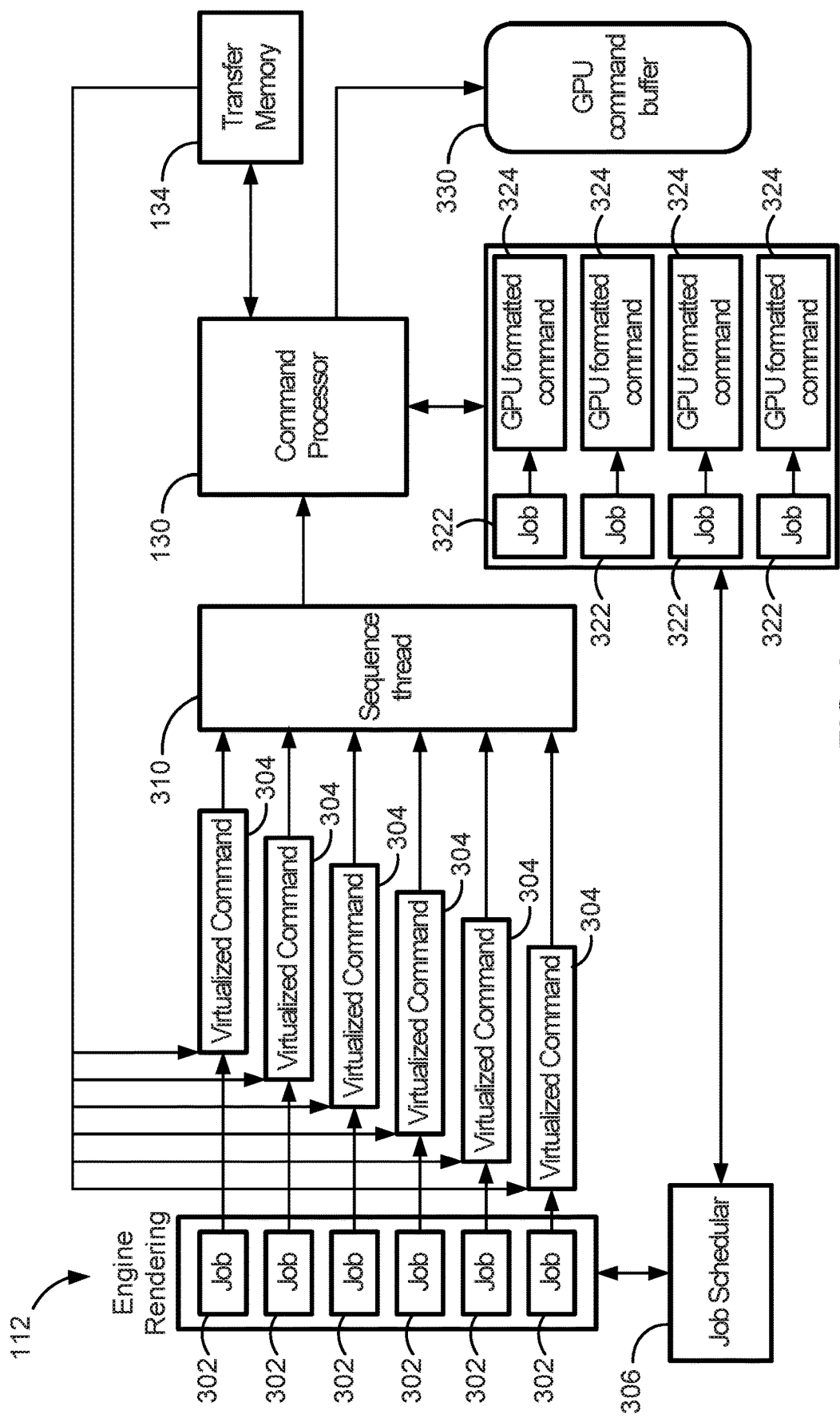
FIG. 3 is a diagram of the command processor scheduling jobs between the GPU and the CPU in FIG. 1.

FIG. 3 is a flow diagram of the commands exchanged by the command processor 130 with the CPU 102 for performing specific jobs from a program such as the game engine 112 in FIG. 1. In this example, the game engine 112 may include a series of jobs 302 which are received by the command processor 130. The jobs 302 are translated into virtual commands 304 in the command format by the command processor 130. The jobs 302 are ordered by a job scheduler 306 which schedules jobs for parallel processing. The virtualized commands 304 are then assembled into a sequence thread 310. The sequence thread 310 is submitted to the command processor 130 which translates the commands into a CPU native format by creating parallel jobs in the sequence thread 310. The jobs 302 are held in the command buffer 132 in FIG. 1 for execution by the CPU 102 or other CPU cores in the system 100.

Another group of jobs 322 from the game engine 112 is received and converted by the command format to GPU formatted commands 324. The jobs 322 are ordered by the job scheduler 306 which schedules jobs for parallel processing by the GPU 106. The GPU formatted commands 324 each use one of the different types of transfer memory of the visual transfer memory 134 as required by the type of command. A GPU command buffer 330 includes a series of commands in serial order which are submitted to the GPU 106 by the command processor 130.

In this example, the system 100 includes several main types of commands in relation to graphics processing for the command processor 130. An example "Draw Primitives" command draws a set of graphics primitives to one or more resources for the purposes of graphics processing. The Draw Primitives command accepts a series of graphics primitives (e.g. triangles), a set of shader programs to execute such as the shader programs 120, a set of CPU data to be used by the shader programs (i.e. data stored in GPU Transfer Memory), and pre-created bundles of state data which control processes such as Alpha blending and depth testing.

Another example command is "Dispatch Compute" which executes generalized GPU program(s) on a set of resources, using set of kernels. Kernels are abstracted regions of computation in three dimensions, (e.g. rows, columns, slices). Of course other commands including specific graphic processing functions such as the Draw Primitives command or general GPU programs such as the Dispatch Compute command may be used by the command processor 130 depending on the types of programs being executed.

The system 100 also includes a series of commands for operating directly on either the CPU memory 110 or the GPU memory 114, such as copying, clearing, resolving, etc. These commands allow functions such as fetching owner command memory, filing out data tables, asynchronous submission of data, submission of commands for execution. An example of an asynchronous request to process some commands received by the command processor 130 is shown in the below code example.

```
    pCommandMemory->pCommands    =
Graphics::ThreadSafe::AllocateOwnerCmdMemory( SIZE_16K);
    pCommandMemory->pBatches    =
Graphics::ThreadSafe::AllocateOwnerCmdMemory( uElements*
sizeof(Graphics::Batch) * GRAPHICS_MAX_MIPS * 2);
    pCommandMemory->pPrimitives =
```

-continued

```
Graphics::ThreadSafe::AllocateOwnerCmdMemory( SIZE_16K);
    pCommandMemory->pShaders    =
Graphics::ThreadSafe::AllocateOwnerCmdMemory( uElements *
sizeof(Graphics::ShaderSet) * cNumShaders);
    pCommandMemory->pKernals    =
Graphics::ThreadSafe::AllocateOwnerCmdMemory( uElements *
sizeof(Graphics::ComputeKernal) * cFloodFillPasse
    for(uint32 iFill = 0;iFill < cFloodFillPasses;iFill++)
    {
        pBatches[uBatches].Init( );
        pBatches[uBatches].ResourceSets[0] = BufferRS1;
        pBatches[uBatches].ShaderSet        = uFloodFillShaderIndex;
        pBatches[uBatches].ShaderMethod =
TextureProcessing::FillTextureMap::main;
        pBatches[uBatches].Primitive      = 0;
    pCurCommand +=
Graphics::AddTransitionEntireResourceCommand(pCurCommand,
Buffer2.Resource, Graphics::RSTATE_COMPUTE_READ,
Graphics::RSTATE_COMPUTE_READWRITE,
"Render Field FloodFill");
    pCurCommand +=
Graphics::AddTransitionEntireResourceCommand(pCurCommand,
Buffer1.Resource,
Graphics::RSTATE_SHADER_READ,
Graphics::RSTATE_COMPUTE_READ,
"Render Field FloodFill") ;
    pCurCommand +=
Graphics::AddComputeSetCommmand(pCurCommand,
BufferRS2, &pBatches[uBatches], 1, pShaders, cNumShaders,
&pKernals[uKernals],1, NULL,0, NULL,0, "Render Field FloodFill");
    pCurCommand +=
Graphics::AddTransitionEntireResourceCommand(pCurCommand,
Buffer2.Resource, Graphics::RSTATE_COMPUTE_READWRITE,
Graphics::RSTATE_COMPUTE_READ,
"Render Field FloodFill");
    pCurCommand +=
Graphics::AddTransitionEntireResourceCommand(pCurCommand,
Buffer1.Resource, Graphics::RSTATE_COMPUTE_READ,
Graphics::RSTATE_COMPUTE_READWRITE,
"Render Field FloodFill") ;
        uBatches++;
        pBatches[uBatches].Init( );
        pBatches[uBatches].ResourceSets[0] = BufferRS2;
        pBatches[uBatches].ShaderSet        = uFloodFillShaderIndex;
        pBatches[uBatches].ShaderMethod =
TextureProcessing::FillTextureMap::main;
        pBatches[uBatches].Primitive      = 0;
    pCurCommand +=
Graphics::AddComputeSetCommmand(pCurCommand,
BufferRS1, &pBatches[uBatches], 1, pShaders, cNumShaders,
&pKernals[uKernals],1, NULL,0, NULL,0, "Render Field FloodFill");
    pCurCommand +=
Graphics::AddTransitionEntireResourceCommand(pCurCommand,
Buffer1.Resource, Graphics::RSTATE_COMPUTE_READWRITE,
Graphics::RSTATE_SHADER_READ,
"Render Field FloodFill" );
        uBatches++;
    }
    uKernals++;
    pCurCommand +=
Graphics::AddReleaseResourceSet(pCurCommand, BufferRS1);
    pCurCommand +=
Graphics::AddReleaseResourceSet(pCurCommand, BufferRS2);
    pCurCommand +=
Graphics::AddReleaseResource(pCurCommand, FloodFillTexture);
    Graphics::ThreadSafe::AsyncSubmit(pCommandMemory-
>pCommands, (uint32) (pCurCommand -pCommandMemory-
>pCommands), AsyncFreeCommandMemory, (uint64)
pCommandMemory);
```

In the above example, the owner command transfer memory type of the graphics transfer memory 134 is allocated for graphic data. In this example, the command processor 130 gets the owner command transfer memory, fills out data tables and submits the data for execution by commands managed by the command processor 130 in an asynchronous queue.

The command language is carefully designed to avoid details which might be specific to a particular type of hardware. The format is a generalized, implementation free, representation of the commands which should execute on the GPU 106. In order to avoid inefficiencies from the command format when it needs to be interpreted to a specific platform, the command processor 130 translates the command format into native commands for the particular platform it is run on such as either the CPU 102 or the GPU 106. The command processor 130 thus has two major features to facilitate execution of programs, the creation of cached parts of GPU state, and the widely parallel processing of commands.

Like CPUs, GPUs have complex mechanisms for loading and unloading data. These bindings often differ from GPU to GPU and from platform to platform. Thus while it is possible in most CPU programming languages to pass a simple pointer to memory, the equivalent pointer on a GPU programming language is a more complex process. A single piece of memory may require dozens of individual pieces of data to properly describe it, all of which vary.

The command processor 130 removes overhead by creating native GPU data structures for requested resource bindings. For example, a set of resources will be created in a resource set. Although the application may create a resource set and attach it as an input/output and command, in reality the command processor 130 will create a GPU native cached copy of the resource set, thereby removing the need to create a complex binding when the command is actually processed, which might require significant CPU resources.

Additionally, the programs for a GPU such as the GPU 106 may also require significant translation and processing, which may even vary depending on the type of resources or state which is bound in any particular command. The command processor 130 creates and manages chunks of GPU programs such as shader group programs and compute group programs in this example. The shader group programs use fixed function graphical hardware such as rasterization hardware to render graphical objects from a program such as a game engine 112. The compute group programs are generalized GPU programs. Both shader programs and compute programs are translated into the sub-variants that might require upon load, such that a GPU program can be activated with little or no cost during the translation phase of the command format. For some hardware, certain combinations of states may require variations of the shader programs. For example, it is possible that the format of the back buffer must be compiled into the shader. The command processor 130 will automatically create the variants required, if possible, so that during the course of command execution, there is no need to do what is referred to as a dynamic shader recompile.

Though the commands may be generated in parallel on many different CPU cores, they are submitted in a serial order on one main render thread such as the thread 310 in FIG. 3 so that the command buffer 330 accessed by the GPU 106 will have a well defined ordering of commands. However, even though the order of the jobs in the GPU command buffer 330 is exact and will be drained in FIFO fashion by the GPU 106, the translation of the command buffer 330 into the GPU native format may occur in parallel on many CPUs. This is because each command is completely autonomous from all other commands, and thus requires no knowledge of any other command which was submitted before it to process correctly.

For example, if three commands A, B, and C, are submitted in the order of A, B, and C, then the command processer 130 may process and complete commands B and C before the processing of A has even begun. However, within the context of any set of commands, the command processor 130 can detect and track the known state of the GPU 106, thereby screening off redundancies at a local level.

Once all commands have been generated, the command processor 130 dispatches the submitted commands (e.g. a DrawPrimitive, or a DispatchCompute command) to multiple CPUs for processing. So long as there exist more commands then there are processors (typically commands range in the 100s or 1000s, while the CPU cores range in the 4-12 range in a typical system), each processor can be kept busy translating the commands into GPU native formats. Once all commands have been processed, the individual commands may be submitted to the GPU 106. Each command or set of commands has been built into the equivalent GPU command buffer 330 in FIG. 3.

The GPU specific meta language such as a shading language (OXSL) is a meta language which encapsulates data bindings and programs written for the GPU 106. Programs exist as a text which is included with the other code for a project (e.g. C++ code for a CPU). During the compilation process, the GPU meta language translates the program language simultaneously into the appropriate CPU and GPU data components.

The GPU specific meta language in this example has two main components, the data layout, and the shader program layout. Data exists as either a constant set or a resource set. Resource sets are bundles of GPU buffers and textures (a.k.a. images) which have well-defined formats and typically live only with the GPU 106. Resource sets are primarily used for operation of a GPU program such as a shader program. Resources sets are relatively rarely used by the CPU 102.

Constant sets are bundles of data which are used for communication between the CPU 102 to the GPU 106. The constant sets are intended to be written to the GPU native memory 114 by the CPU 102, then to be consumed by a program executing on the GPU 106. Because of the massive number of communication requests between the CPU 102 and the GPU 106, it is imperative that the communication of this data be as efficient as possible. However, the alignment, format and general constraints of a GPU 106 and CPU 102 specific programming language do not match and therefore the use of constant sets facilitates communication between the CPU 106 and the CPU 102.

The GPU specific meta language compiler therefore generates the two independent representations, or views of the data communicated between the CPU 106 and CPU 102. One of these views is generated in C++ for CPU programs, and the other is created for GPU programs in this example. The views are created in such a manner that the physical layout of memory is identical for both the CPU 102 and the GPU 106. This is done via using extended data types in C++, and by using alignment extensions in C++ to match the CPU types to the same memory format the GPU would use. For example, the command:

```
ConstantSet FontDynamics
{
    float4 D_vColor;
    float4 D_vStrokeColor;
    float2 D_vViewportSize;
```

```
      float  D_fAlpha;
      int4   D_vClipRegion;
};
``` is translated into C++ as follows for use by the CPU 102.

```
struct FontDynamics
{
    DECLARE_ALIGNED(16, OX::Core::v4<float> D_vColor);
    DECLARE_ALIGNED(16, OX::Core::v4<float> D_vStrokeColor);
    DECLARE_ALIGNED(16, OX::Core::v2<float> D_vViewportSize);
    float D_fAlpha;
    DECLARE_ALIGNED(16, OX::Core::v4<int32> D_vClipRegion);
    uint8 Padding[192];
};
```

The same command may be translated into HLSL, a language for programming the GPU 106, as follows:

```
cbuffer FontDynamics : register(b0)
{
    float4 D_vColor : packoffset(c0.x);
    float4 D_vStrokeColor : packoffset(c1.x);
    float2 D_vViewportSize : packoffset(c2.x);
    float1 D_fAlpha : packoffset(c2.z);
    int4 D_vClipRegion : packoffset(c3.x);
};
```

The compute programs are executed via the compute command in the command format by the command processor 130, while shader programs 120 are executed via the draw primitive command in the command format by the command processor 130.

A shader program is bundled inside a shader group, which contains all the bindings to be translated by the shader language compiler, as well as the GPU shading programs. The GPU shading programs are not actually part of the shader language, but rather are passed to the appropriate shader compiler for the platform being targeted. In this way, the shader language is platform neutral.

The following describes an example shader group. It contains two programs, and a variety of state data which might be necessary for the GPU program to operate. A shader group thus contains a complete bundle of information necessary to build a GPU program.

```
ShaderGroup FontShaders
{
    ResourceSetPrimitive = FontVertexData;
    ConstantSetDynamic[0] = FontDynamics;
    ResourceSetBatch[0]   = FontTextureData;
    RenderTargetFormats   = R8G8B8A8_UNORM,
    R16G16B16A16_FLOAT;
    BlendStates           = BlendOn, BlendOff;
    DepthTargetFormats    = UNKNOWN;
    Methods
    {
        GlyphShader:
            CodeBlocks   = FontShaders;
            VertexShader = FontVS;
            PixelShader  = GlyphPS;
        StrokeShader:
            CodeBlocks   = FontShaders;
            VertexShader = FontVS;
            PixelShader  = StrokePS;
    }
}
```

The GPU specific meta language compiler takes all data input from all of these shader programs and injects them into the application via creating C++ code and headers which will build the appropriate virtualized command objects need to run this GPU program. In this manner, a GPU program effectively becomes visible to the CPU program since the program itself, and its data inputs and outputs turn into C++ (and thereby CPU) visible types and objects.

This system 100 facilitates the efficient execution of GPU programs which use CPU provided data, while providing an abstraction from any particular GPU hardware design. The combination of the command language, (whereby code written and executed on the CPU can create commands by which a GPU can execute), the command processor 130, (which translates the commands into the native GPU commands), and a GPU specific meta language, (whereby programs created for the GPU 106 can be cross compiled so that the data bindings become compatible between both the CPU 102 and GPU 106) allows for efficient execution of programs using both the CPU 102 and GPU 106.

Figure 4:
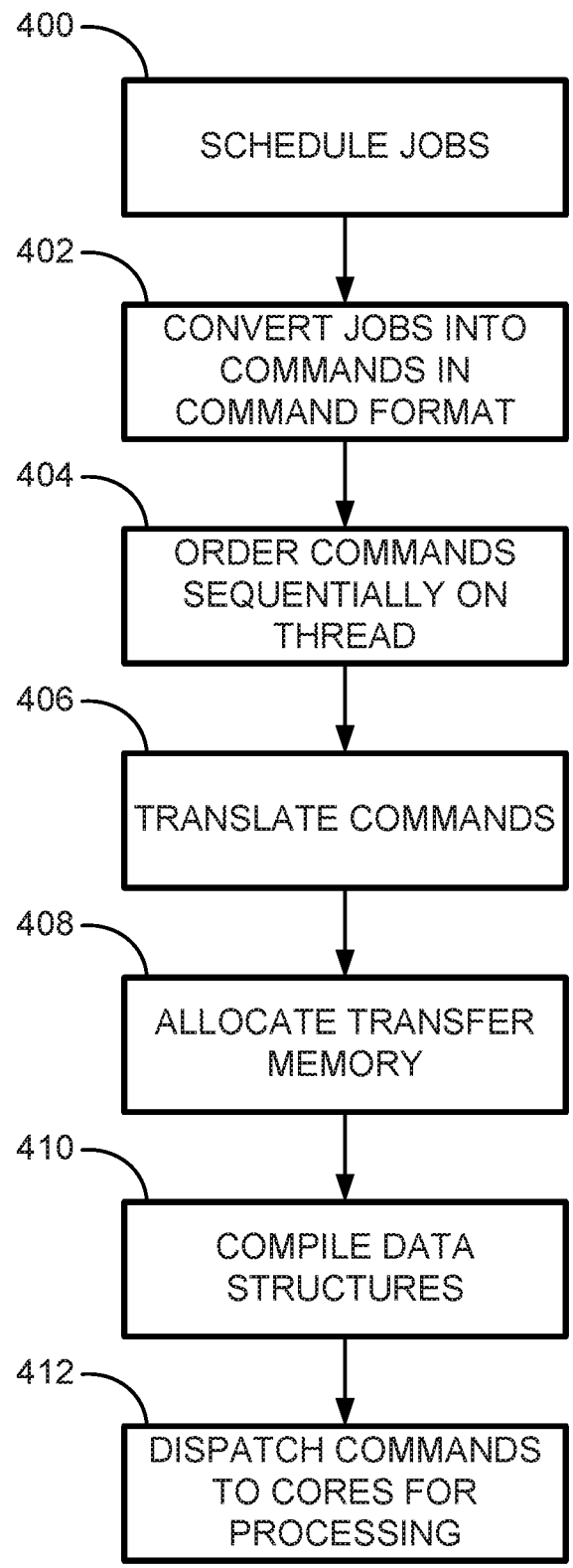
FIG. 4 is a flow diagram of the process used to interpret instructions for scheduling in the CPU and GPU of the multi-core system in FIG. 1.

The process of translating commands for execution by the CPU 102 and GPU 106 of the example system 100 will now be described with reference to FIGS. 1-3 in conjunction with the flow diagram shown in FIG. 4. The flow diagram in FIG. 4 is representative of example machine readable instructions for generating commands to use different types of cores in a multi-core system. In this example, the machine readable instructions comprise an algorithm for execution by: (a) a processor, (b) a controller, and/or (c) one or more other suitable processing device(s) such as a GPU. The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 4 may be implemented manually. Further, although the example algorithm is described with reference to the flowcharts illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 4 is a flow diagram of process executed by the command processor 130 to schedule jobs from a program for execution by multiple different cores such as the CPU 102 and the GPU 106 in FIG. 1. The command processor 130 first schedules jobs to run on the CPU 102 or other processing cores (400). The jobs are then converted to virtualized commands using the command format (402). The virtualized commands are ordered sequentially on a thread on the command buffer 132 in FIG. 1 (404). The command processor 130 then translates the commands into native formats by creating shader groups and compute groups (406).

The command processor 130 allocates the transfer memory for the translated commands 408. The GPU meta language translates the data structures via the compiler to both native CPU and GPU formats 410. The command processor 130 then dispatches the commands to the CPU 102 and GPU 106 for processing 412.

Each of these embodiments and obvious variations thereof is contemplated as falling within the spirit and scope of the claimed invention, which is set forth in the following claims.

What is claimed is:

1. A system to interface between two computer processing units to execute a program, the system comprising:
    a first processing unit device configured to execute commands in a first programming language;
    a second processing unit device configured to execute commands in a second programming language that is distinct from the first programming language;
    a command processor configured to generate one or more commands for execution by the first processing unit device or the second processing unit device;
    a data compiler configured to convert program data for the one or more commands into a first data format usable by the first programming language and a second data format usable by the second programming language; and
    a transfer memory accessible by the first processing unit device and the second processing unit device, the transfer memory being configured to store the program data generated by one of the first processing unit device or the second processing unit device, the one or more commands created by the command processor requiring asynchronous communication by the first processing unit device and the second processing unit device.

2. The system of claim 1, wherein the data compiler is configured to run a meta language to convert the program data for the one or more commands into the first data format and the second data format.

3. The system of claim 2, wherein the meta language includes resource sets and constant sets.

4. The system of claim 1, wherein the command processor is configured to be accessible by both the first processing unit device and the second processing unit device.

5. The system of claim 1, wherein the command processor is configured to manage jobs from the program for processing by the first processing unit device or the second processing unit device.

6. The system of claim 1, wherein the one or more commands generated by the command processor include a first sequence of commands for execution by the first processing unit device and a second sequence of commands for execution by the second processing unit device.

7. The system of claim 6, wherein the first processing unit device executes the first sequence of commands in parallel with the second processing unit device executing the second sequence of commands.

8. The system of claim 1, wherein the first processing unit device is a central processing unit (CPU) device and the second processing unit device is a graphics processing unit (GPU) device.

9. The system of claim 1, wherein the one or more commands include one or more commands for specific graphic processing functions or for general processing unit operations.

10. The system of claim 1, wherein the transfer memory includes (i) frame graphics transfer memory allowing transfer of data from the second processing unit device to the first processing unit device, (ii) frame command transfer memory visible to the first processing unit device to translate the one or more commands, (iii) owner graphics transfer memory allowing transfer of data from the first processing unit device to the second processing unit device, (iv) owner command memory storing command instructions, or (v) any combination of (i)-(iv).

11. The system of claim 1, wherein the commands are in a state-free command format.

12. The system of claim 11, wherein each of the one or more commands include all state information required to execute each of the one or more commands independently of others of the one or more commands.

13. The system of claim 11, wherein the command format maps each of the one or more commands to a plurality of different hardware platforms.

14. A method for scheduling jobs for a first processing unit device and a second processing unit device, the method comprising:
    generating one or more commands including asynchronous commands for execution by the first processing unit device or the second processing unit device;
    converting program data for the one or more commands into a first format usable by a first programming language associated with the first processing unit device, and into a second data format usable by a second programming language associated with the second processing unit device, the second programming language being distinct from the first programming language;
    storing the command in a command buffer; and
    storing resources for the one or more commands in a transfer memory, the transfer memory being separate and distinct from the command buffer, the transfer memory being accessible by the first processing unit device and the second processing unit device.

15. The method of claim 14, further comprising obtaining one or more jobs from a program, the one or more jobs configured to be executed by a plurality of threads.

16. The method of claim 15, wherein the one or more commands are generated independently from each other, and wherein the one or more commands are configured to be executed by one or more of the plurality of threads to thereby execute the one or more jobs.

17. The method of claim 14, wherein the first processing unit device is a central processing unit (CPU) device and the second processing unit device is a graphics processing unit (GPU) device.

18. A non-transitory, machine readable medium having stored thereon instructions for scheduling commands for execution by a plurality of processor cores including a first processing unit device and a second processing unit device, the stored instructions comprising machine executable code, which when executed by at least one machine processor, causes the machine processor to:
    generate one or more commands including asynchronous commands for execution by the first processing unit device or the second processing unit device;
    convert program data for the one or more commands into a first format usable by a first programming language associated with the first processing unit device, and into a second data format usable by a second programming language associated with the second processing unit device, the second programming language being distinct from the first programming language;
    store the command in a command buffer; and
    store resources for the one or more commands in a transfer memory, the transfer memory being separate and distinct from the command buffer, the transfer memory being accessible by the first processing unit device and the second processing unit device.

19. The non-transitory, machine readable medium of claim 18, wherein the machine executable code, when executed by the at least one machine processor, further causes the machine processor to obtain one or more jobs from a program, the one or more jobs configured to be executed by a plurality of threads, the one or more commands being generated independently from each other, the one or more commands being configured to be executed by one or more of the plurality of threads to thereby execute the one or more jobs.

20. The non-transitory, machine readable medium of claim 18, wherein the first processing unit device is a central processing unit (CPU) device and the second processing unit device is a graphics processing unit (GPU) device.

* * * * *